US010581927B2

United States Patent
Ezell et al.

(10) Patent No.: US 10,581,927 B2
(45) Date of Patent: Mar. 3, 2020

(54) PROVIDING WEB REAL-TIME COMMUNICATIONS (WEBRTC) MEDIA SERVICES VIA WEBRTC-ENABLED MEDIA SERVERS, AND RELATED METHODS, SYSTEMS, AND COMPUTER-READABLE MEDIA

(71) Applicant: Avaya Inc., Basking Ridge, NJ (US)

(72) Inventors: Joel Ezell, Broomfield, CO (US); John H. Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 781 days.

(21) Appl. No.: 14/255,361

(22) Filed: Apr. 17, 2014

(65) Prior Publication Data

US 2015/0304379 A1 Oct. 22, 2015

(51) Int. Cl.
*H04L 29/06* (2006.01)
*H04L 12/18* (2006.01)
*H04L 29/08* (2006.01)

(52) U.S. Cl.
CPC ...... *H04L 65/1069* (2013.01); *H04L 12/1818* (2013.01); *H04L 29/06312* (2013.01);
(Continued)

(58) Field of Classification Search
CPC . H04L 65/1069; H04L 65/601; H04L 65/605; H04L 65/608; H04L 65/4015;
(Continued)

(56) References Cited

U.S. PATENT DOCUMENTS 6,714,967 B1 3/2004 Horvitz
7,107,316 B2 9/2006 Brown et al.
(Continued)

FOREIGN PATENT DOCUMENTS

EP 1615386 A1 1/2006
EP 2529316 A2 12/2012
(Continued)

OTHER PUBLICATIONS

Non-Final Office Action for U.S. Appl. No. 13/955,711, dated Nov. 9, 2015, 10 pages.
(Continued)

*Primary Examiner* — Gregory G Todd
(74) *Attorney, Agent, or Firm* — Sheridan Ross P.C.

(57) ABSTRACT

In one embodiment, a system for providing WebRTC media services comprises a WebRTC-enabled media server including a scripting engine, a WebRTC functionality provider, and a control application programming interface (API). The WebRTC-enabled media server is configured to receive, from a WebRTC application server, a stream establishment application, and to establish, via the stream establishment application, a plurality of WebRTC interactive flows associated with a corresponding plurality of WebRTC clients. The WebRTC-enabled media server is also configured to apply a media service to one or more of the plurality of WebRTC interactive flows to generate one or more media server flows, and provide the media server flows to one or more of the plurality of WebRTC clients. The WebRTC-enabled media server may thus provide functionality via familiar WebRTC control interfaces.

20 Claims, 5 Drawing Sheets

(52) U.S. Cl.
CPC ........ *H04L 65/4015* (2013.01); *H04L 65/608* (2013.01); *H04L 29/06306* (2013.01); *H04L 29/06326* (2013.01); *H04L 29/08306* (2013.01); *H04L 29/08531* (2013.01); *H04L 67/02* (2013.01)

(58) Field of Classification Search
CPC ......... H04L 29/06312; H04L 29/06306; H04L 29/06326; H04L 29/08306; H04L 29/08531; H04L 12/1818
See application file for complete search history.

(56) References Cited

U.S. PATENT DOCUMENTS

| | | |
|---|---|---|
| 7,145,898 B1 | 12/2006 | Elliott |
| 7,266,591 B1 | 9/2007 | Johnston |
| 7,379,993 B2 | 5/2008 | Valdes et al. |
| 7,636,348 B2 | 12/2009 | Bettis et al. |
| 7,730,309 B2 | 6/2010 | Zimmermann |
| 8,015,484 B2 | 9/2011 | Backer |
| 8,250,635 B2 | 8/2012 | Chari et al. |
| 8,300,632 B2 | 10/2012 | Davis et al. |
| 8,467,308 B2 | 6/2013 | Johnston |
| 8,494,507 B1 | 7/2013 | Tedesco et al. |
| 8,601,144 B1 | 12/2013 | Ryner |
| 8,605,711 B1 | 12/2013 | Sinnreich et al. |
| 8,606,950 B2 | 12/2013 | Glatron et al. |
| 8,693,392 B2 | 4/2014 | Cooper et al. |
| 8,695,077 B1 | 4/2014 | Gerhard et al. |
| 8,737,596 B2 | 5/2014 | Kelley et al. |
| 8,744,147 B2 | 6/2014 | Torti |
| 8,832,271 B2 | 9/2014 | McCarty |
| 8,856,236 B2 | 10/2014 | Moore et al. |
| 8,861,692 B1 | 10/2014 | Phelps et al. |
| 8,867,731 B2 | 10/2014 | Lum et al. |
| 10,055,742 B2 * | 8/2018 | Phelps ................. G06Q 30/016 |
| 2002/0161685 A1 | 10/2002 | Dwinnell |
| 2003/0112766 A1 | 6/2003 | Riedel et al. |
| 2003/0120599 A1 | 6/2003 | Agboatwalla et al. |
| 2003/0131245 A1 | 7/2003 | Linderman |
| 2003/0188193 A1 | 10/2003 | Venkataramappa |
| 2004/0019494 A1 | 1/2004 | Ridgeway et al. |
| 2004/0081173 A1 | 4/2004 | Feather |
| 2004/0093515 A1 | 5/2004 | Reeves, Jr. |
| 2004/0167984 A1 | 8/2004 | Herrmann |
| 2004/0216173 A1 | 10/2004 | Horoszowski et al. |
| 2005/0084082 A1 | 4/2005 | Horvitz et al. |
| 2005/0177380 A1 | 8/2005 | Pritchard et al. |
| 2006/0104526 A1 | 5/2006 | Gringeler et al. |
| 2006/0155814 A1* | 7/2006 | Bennett ............ H04L 29/06027 709/207 |
| 2006/0159063 A1 | 7/2006 | Kumar |
| 2006/0200855 A1 | 9/2006 | Willis |
| 2006/0230438 A1 | 10/2006 | Shappir et al. |
| 2007/0083929 A1 | 4/2007 | Sprosts et al. |
| 2007/0143408 A1 | 6/2007 | Daigle |
| 2007/0255662 A1 | 11/2007 | Tumminaro |
| 2007/0283423 A1 | 12/2007 | Bradley et al. |
| 2008/0046414 A1 | 2/2008 | Haub et al. |
| 2008/0046457 A1 | 2/2008 | Haub et al. |
| 2008/0046838 A1 | 2/2008 | Haub et al. |
| 2008/0127137 A1 | 5/2008 | Becker et al. |
| 2008/0162642 A1 | 7/2008 | Bachiri et al. |
| 2008/0192646 A1 | 8/2008 | Song et al. |
| 2008/0270541 A1 | 10/2008 | Keener et al. |
| 2009/0070477 A1 | 3/2009 | Baum et al. |
| 2009/0094684 A1 | 4/2009 | Chinnusamy et al. |
| 2009/0300060 A1 | 12/2009 | Beringer et al. |
| 2010/0011282 A1 | 1/2010 | Dollard et al. |
| 2010/0023519 A1 | 1/2010 | Kailash et al. |
| 2010/0024019 A1 | 1/2010 | Backlund |
| 2010/0037324 A1 | 2/2010 | Grant et al. |
| 2010/0118700 A1 | 5/2010 | Blum et al. |
| 2010/0246571 A1 | 9/2010 | Geppert et al. |
| 2011/0102930 A1 | 5/2011 | Johnston et al. |
| 2011/0206013 A1 | 8/2011 | Aramoto et al. |
| 2011/0238862 A1 | 9/2011 | Chaturvedi et al. |
| 2012/0001932 A1 | 1/2012 | Burnett et al. |
| 2012/0079031 A1 | 3/2012 | Matthews et al. |
| 2012/0137231 A1 | 5/2012 | Maxfield et al. |
| 2012/0158862 A1 | 6/2012 | Mosko et al. |
| 2012/0192086 A1 | 7/2012 | Ghods et al. |
| 2013/0002799 A1 | 1/2013 | Mock |
| 2013/0078972 A1 | 3/2013 | Levien et al. |
| 2013/0091286 A1 | 4/2013 | Spencer |
| 2013/0138829 A1 | 5/2013 | Bulava |
| 2013/0321340 A1 | 12/2013 | Seo et al. |
| 2013/0325934 A1 | 12/2013 | Fausak et al. |
| 2013/0346329 A1 | 12/2013 | Alib-Bulatao et al. |
| 2014/0013202 A1 | 1/2014 | Schlumberger |
| 2014/0043994 A1 | 2/2014 | Bansal et al. |
| 2014/0095633 A1 | 4/2014 | Yoakum |
| 2014/0095724 A1 | 4/2014 | Yoakum et al. |
| 2014/0095731 A1 | 4/2014 | Carey et al. |
| 2014/0108594 A1 | 4/2014 | Siegel et al. |
| 2014/0126708 A1 | 5/2014 | Sayko |
| 2014/0126714 A1 | 5/2014 | Sayko |
| 2014/0126715 A1 | 5/2014 | Lum et al. |
| 2014/0143823 A1 | 5/2014 | Manchester et al. |
| 2014/0149512 A1* | 5/2014 | Leitch ................. H04L 67/1061 709/204 |
| 2014/0161237 A1 | 6/2014 | Tolksdorf |
| 2014/0201820 A1 | 7/2014 | Li et al. |
| 2014/0219167 A1* | 8/2014 | Santhanam ....... H04W 28/0268 370/328 |
| 2014/0222894 A1 | 8/2014 | Gangadharan et al. |
| 2014/0222930 A1 | 8/2014 | Gangadharan et al. |
| 2014/0223452 A1* | 8/2014 | Santhanam ........... H04L 67/141 719/328 |
| 2014/0237057 A1 | 8/2014 | Khodorenko |
| 2014/0241215 A1 | 8/2014 | Massover et al. |
| 2014/0244235 A1 | 8/2014 | Michaelis |
| 2014/0245143 A1 | 8/2014 | Saint-Marc |
| 2014/0258822 A1 | 9/2014 | Li et al. |
| 2014/0269326 A1 | 9/2014 | Westin et al. |
| 2014/0270104 A1 | 9/2014 | O'Connor |
| 2014/0280734 A1 | 9/2014 | Chaturvedi et al. |
| 2014/0282054 A1 | 9/2014 | Yoakum |
| 2014/0282135 A1 | 9/2014 | Segre |
| 2014/0282399 A1 | 9/2014 | Gorelik et al. |
| 2014/0282765 A1 | 9/2014 | Casey et al. |
| 2014/0282903 A1 | 9/2014 | Singh et al. |
| 2014/0324979 A1* | 10/2014 | Gao ....................... G06F 17/00 709/204 |
| 2014/0325078 A1* | 10/2014 | Shan ................. H04W 36/0066 709/227 |
| 2014/0344169 A1 | 11/2014 | Phelps et al. |
| 2014/0348044 A1* | 11/2014 | Narayanan .......... H04L 65/1016 370/310 |
| 2014/0365676 A1 | 12/2014 | Yoakum |
| 2014/0379931 A1* | 12/2014 | Gaviria ............... H04L 65/1016 709/227 |
| 2015/0002614 A1 | 1/2015 | Zino et al. |
| 2015/0002619 A1 | 1/2015 | Johnston et al. |
| 2015/0006610 A1 | 1/2015 | Johnston et al. |
| 2015/0006611 A1 | 1/2015 | Johnston et al. |
| 2015/0026473 A1 | 1/2015 | Johnston et al. |
| 2015/0036690 A1 | 2/2015 | Pastro |
| 2015/0039687 A1 | 2/2015 | Waxman et al. |
| 2015/0039760 A1 | 2/2015 | Yoakum |
| 2015/0052067 A1 | 2/2015 | Thiyagarajan et al. |
| 2015/0106837 A1* | 4/2015 | Li ....................... H04N 21/8586 725/30 |
| 2015/0180748 A1* | 6/2015 | Ding ..................... H04L 41/046 709/224 |
| 2015/0180825 A1 | 6/2015 | Ren et al. |

(56) References Cited

U.S. PATENT DOCUMENTS

2015/0286630 A1* 10/2015 Bateman ........... G06F 17/30241
 704/9
2015/0304379 A1* 10/2015 Ezell ....................... H04L 67/02
 709/219

FOREIGN PATENT DOCUMENTS

| GB | 2295747 | A | 6/1996 | |
|---|---|---|---|---|
| GB | 2468758 | A | 9/2010 | |
| GB | 2468759 | A | 9/2010 | |
| GB | 2517833 | A | 3/2015 | |
| JP | 2002207683 | A | 7/2002 | |
| JP | 2002374318 | A | 12/2002 | |
| JP | 2005346556 | A | 12/2005 | |
| JP | 2006050407 | A | 2/2006 | |
| JP | 2011504665 | A | 2/2011 | |
| WO | 2014060008 | A1 | 4/2014 | |
| WO | 2014123738 | A1 | 8/2014 | |
| WO | WO-2014142715 | A1 * | 9/2014 | ......... H04L 65/1069 |
| WO | 2014190094 | A1 | 11/2014 | |
| WO | 2015032277 | A1 | 3/2015 | |

OTHER PUBLICATIONS

Notice of Allowance for U.S. Appl. No. 14/050,891, dated Nov. 10, 2015, 10 pages.
Non-Final Office Action for U.S. Appl. No. 13/955,023, dated Dec. 9, 2015, 13 pages.
Non-Final Office Action for U.S. Appl. No. 14/037,440, dated Oct. 22, 2015, 15 pages.
Advisory Action for U.S. Appl. No. 13/931,967, dated Nov. 3, 2015, 3 pages.
Advisory Action for U.S. Appl. No. 13/931,970, dated Nov. 5, 2015, 3 pages.
Non-Final Office Action for U.S. Appl. No. 14/068,943, dated Dec. 2, 2015, 16 pages.
Non-Final Office Action for U.S. Appl. No. 14/255,429, dated Nov. 9, 2015, 26 pages.
Search Report for British Patent Application No. GB1423089.0, dated Jul. 6, 2015, 4 pages.
Andreasen et al., "Session Description Protocol (SDP): Security Descriptions for Media Streams," Network Working Group, Request for Comments: 4568, Standards Track, The Internet Society, Jul. 2006, 40 pages.
Baugher et al., "The Secure Real-time Transport Protocol (SRTP)," Network Working Group, Request for Comments: 3711, Standards Track, The Internet Society, Mar. 2004, 51 pages.
Johnston, Alan et al., "Taking on WebRTC in an Enterprise," IEEE Communications Magazine, Apr. 2013, pp. 48-54, vol. 51, Issue 4.
Johnston et al., "WebRTC: APIs and RTCWEB Protocols of the HTML5 Real-Time Web," (Book), Second Edition, Smashwords Edition, Digital Codex LLC, Jun. 2013, 254 pages.
Mahy et al., "Traversal Using Relays around NAT (TURN) : Relay Extensions to Session Traversal Utilities for NAT (STUN)," Internet Engineering Task Force, Request for Comments: 5766, Standards Track, IETF Trust, Apr. 2010, 61 pages.
McGrew et al., "Datagram Transport Layer Security (DTLS) Extension to Establish Keys for the Secure Real-Time Transport Protocol (SRTP)," Internet Engineering Task Force, Request for Comments: 5764, Standards Track, IETF Trust, May 2010, 24 pages.
Singh, Kundan et al., "Building Communicating Web Applications Leveraging Endpoints and Cloud Resource Service," Presented at the Sixth International Conference on Cloud Computing, Jun. 28, 2013, Santa Clara, California, IEEE Computer Society, pp. 486-493.
Singh, Kundan et al., "Private Overlay of Enterprise Social Data and Interactions in the Public Web Context," presented at the 9th IEEE International Conference on Collaborative Computing: Networking, Applications and Worksharing (Collaboratecom), Oct. 20-23, 2013, Austin, Texas, IEEE, 10 pages.
Zimmermann et al., "ZRTP: Media Path Key Agreement for Unicast Secure RTP," Internet Engineering Task Force, Request for Comments: 6189, Informational, IETF Trust, Apr. 2011, 102 pages.
Search Report for British patent application GB1317121.0 dated Mar. 14, 2014, 3 pages.
Search Report for British patent application GB1317122.8 dated Mar. 11, 2014, 3 pages.
Berners-Lee, Tim, "Socially Aware Cloud Storage," Notes on web design, Aug. 17, 2009, http://www.w3.org/DesignIssues/CloudStorage.html, 9 pages.
Chandra, Ramesh et al., "Separating Web Applications from User Data Storage with BStore," presented at the USENIX Conference on Web Application Development, Jun. 2010, Boston, Massachusettes, 13 pages.
Davids, Carol et al., "SIP APIs for Voice and Video Communications on the Web," presented at the International Conference on Principles, Systems and Applications of IP Telecommunications (IPTcomm), Aug. 2011, Chicago, Illinois, 7 pages.
Geambasu, Roxana et al., "Organizing and Sharing Distributed Personal Web-Service Data," presented at the International World Wide Web Conference, Apr. 21-25, 2008, Beijing, China, International World Wide Web Conference Committee, pp. 755-764.
Hsu, F. et al., "Secure File System Services for Web 2.0 Applications," presented at the ACM Cloud Computing Security Workshop, Nov. 13, 2009, Chicago, Illinois, Association for Computing Machinery, 7 pages.
Joshi, R., "Data-Oriented Architecture: A Loosley Coupled Real-Time SOA," Whitepaper, Aug. 2007, Real-Time Innovations, Inc., http://rtcgroup.com/whitepapers/files/RTI_DataOrientedArchitecture_WhitePaper.pdf, 54 pages.
Vahdat, Amin et al., "WebFS: A Global Cache Coherent File System," UC Berkeley, Dec. 1996, retrieved Sep. 16, 2014 from https://www.cs.duke.edu/~vahdat/webfs/webfs.html, 12 pages.
Non-Final Office Action for U.S. Appl. No. 14/037,440, dated Sep. 12, 2014, 15 pages.
Barth, A. "The Web Origin Concept," Internet Engineering Task Force (IETF), Request for Comments 6454 (RFC 6454), Dec. 2011, 19 pages, http://www.ietf.org/rfc/rfc6454.txt.
Fischl, J. et al., "Framework for Establishing a Secure Real-time Transport Protocol (SRTP) Security Context Using Datagram Transport Layer Security (DTLS)," Internet Engineering Task Force (IETF), Request for Comments (RFC) 5763, May 2010, 26 pages.
Jesup, R. et al., "DTLS Encapsulation of SCTP Packets for RTCWEB," IETF: Network Working Group, Internet Draft, Feb. 16, 2013, 6 pages.
Johnston, A. et al., "An Origin Attribute for the STUN Protocol," Internet Engineering Task Force (IETF), Internet-Draft, Jul. 20, 2014, 14 pages, https://tools.ietf.org/html/draft-ietf-tram-stun-origin-00.
Rescorla, E., "Security Considerations for RTC-Web," IETF RTCWEB, Internet Draft, Jan. 22, 2013, 16 pages.
Rescorla, E., "WebRTC Security Architecture," IETF RTCWEB, Internet Draft, Jul. 14, 2013, 30 pages.
Corrected Notice of Allowability for U.S. Appl. No. 13/931,968, dated Apr. 24, 2015, 4 pages.
Advisory Action for U.S. Appl. No. 14/037,440, dated May 20, 2015, 3 pages.
Search Report for British Patent Application GB1419338.7, dated Apr. 27, 2015, 4 pages.
Search Report for British Patent Application GB1419334.6, dated Apr. 28, 2015, 6 pages.
Notice of Allowance for U.S. Appl. No. 13/944,368, dated Apr. 1, 2015, 8 pages.
Non-Final Office Action for U.S. Appl. No. 13/931,967, dated May 5, 2015, 10 pages.
Non-Final Office Action for U.S. Appl. No. 13/931,970, dated May 7, 2015, 9 pages.
Rodriguez, Pedro et al., "Advanced Videoconferencing Services Based on WebRTC," IADIS International Conferences Web Based Communities and Social Media 2012 and Collaborative Technologies 2012, Jul. 17-23, 2012, pp. 180-184, http://www.iadisportal.org/wbc-2012-proceedings.

(56) References Cited

OTHER PUBLICATIONS

Examination Report for British Patent Application GB1411584.4, dated Aug. 21, 2015, 1 page.
Examination Report for British Patent Application GB1411580.2, dated Aug. 21, 2015, 1 page.
Notification of Reasons for Refusal for Japanese Patent Application 2013-201221, dated Aug. 25, 2015, 8 pages.
Non-Final Office Action for U.S. Appl. No. 13/835,913, dated Sep. 3, 2015, 19 pages.
Non-Final Office Action for U.S. Appl. No. 13/912,520, dated Sep. 9, 2015, 21 pages.
Non-Final Office Action for U.S. Appl. No. 13/863,662, dated Sep. 25, 2015, 23 pages.
Advisory Action for U.S. Appl. No. 13/803,292, dated Aug. 21, 2015, 3 pages.
Non-Final Office Action for U.S. Appl. No. 13/803,292, dated Oct. 9, 2015, 13 pages.
Advisory Action and Examiner-Initiated Interview Summary for U.S. Appl. No. 14/050,891, dated Sep. 29, 2015, 4 pages.
Final Office Action for U.S. Appl. No. 14/068,839, dated Sep. 9, 2015, 17 pages.
Final Office Action for U.S. Appl. No. 13/931,967, dated Aug. 20, 2015, 12 pages.
Final Office Action for U.S. Appl. No. 13/931,970, dated Aug. 27, 2015, 10 pages.
Loreto, Salvatore et al., "Real-Time Communications in the Web: Issues, Achievements, and Ongoing Standardization Efforts," IEEE Internet Computing, vol. 16, Issue 5, IEEE Computer Society, Oct. 2, 2012, pp. 68-73.
Search Report for British patent application GB1411584.4 dated Dec. 30, 2014, 4 pages.
Search Report for British patent application GB1411580.2 dated Dec. 30, 2014, 4 pages.
Non-Final Office Action for U.S. Appl. No. 13/931,968, dated Dec. 8, 2014, 6 pages.
Non-Final Office Action for U.S. Appl. No. 13/835,913, dated Nov. 20, 2014, 15 pages.
Non-Final Office Action for U.S. Appl. No. 13/803,292, dated Jan. 27, 2015, 13 pages.
Non-Final Office Action for U.S. Appl. No. 14/050,891, dated Jan. 29, 2015, 9 pages.
Non-Final Office Action for U.S. Appl. No. 13/955,023, dated Feb. 2, 2015, 12 pages.
Author Unknown, "WebRTC," WebRTC.org, Date Accessed: Jan. 26, 2016, 4 pages, http://webrtc.org/.
Notice of Allowance for U.S. Appl. No. 13/863,662, dated Feb. 1, 2016, 17 pages.
Advisory Action and Examiner-Initiated Interview Summary for U.S. Appl. No. 14/068,839, dated Feb. 12, 2016, 4 pages.
Final Office Action for U.S. Appl. No. 14/141,798, dated Dec. 24, 2015, 10 pages.
Non-Final Office Action for U.S. Appl. No. 14/174,371, dated Feb. 18, 2016, 18 pages.
Non-Final Office Action for U.S. Appl. No. 13/931,970, dated Feb. 23, 2016, 11 pages.
Bergkvist, Adam et al., "WebRIC 1.0: Real-time Communication Between Browsers," W3C Working Draft, Feb. 9, 2012, http://www.w3.org/TR/2012/WD-webrtc-20120209/, 42 pages.
Notice of Reason for Refusal for Japanese Patent Application 2013-201228, dispatched Jun. 11, 2015, 8 pages.
Advisory Action for U.S. Appl. No. 13/835,913, dated Jun. 10, 2015, 3 pages.
Final Office Action for U.S. Appl. No. 13/803,292, dated Jun. 12, 2015, 17 pages.
Final Office Action and Examiner Initiated Interview Summary for U.S. Appl. No. 14/050,891, dated Jun. 29, 2015, 11 pages.
Final Office Action for U.S. Appl. No. 13/955,023, dated Jul. 20, 2015, 17 pages.
Corrected Notice of Allowability for U.S. Appl. No. 13/944,368, dated Jul. 23, 2015, 4 pages.
Non-Final Office Action for U.S. Appl. No. 14/141,798, dated Jul. 17, 2015, 13 pages.
Extended European Search Report for European Patent Application 15161452.6, dated Jun. 23, 2015, 5 pages.
Notice of Allowance for U.S. Appl. No. 13/931,968, dated Mar. 23, 2015, 7 pages.
Final Office Action for U.S. Appl. No. 13/835,913, dated Mar. 26, 2015, 17 pages.
Final Office Action for U.S. Appl. No. 14/037,440, dated Feb. 11, 2015, 19 pages.
Non-Final Office Action for U.S. Appl. No. 14/068,839, dated Feb. 20, 2015, 15 pages.

* cited by examiner

PROVIDING WEB REAL-TIME COMMUNICATIONS (WEBRTC) MEDIA SERVICES VIA WEBRTC-ENABLED MEDIA SERVERS, AND RELATED METHODS, SYSTEMS, AND COMPUTER-READABLE MEDIA

BACKGROUND

Field of the Disclosure

The technology of the disclosure relates generally to Web Real-Time Communications (WebRTC) interactive flows.

Technical Background

Web Real-Time Communications (WebRTC) represents an ongoing effort to develop industry standards for integrating real-time communications functionality into web clients, such as web browsers, to enable direct interaction with other web clients. This real-time communications functionality is accessible by web developers via standard markup tags, such as those provided by version 5 of the Hypertext Markup Language (HTML5), and client-side scripting Application Programming Interfaces (APIs) such as JavaScript APIs. More information regarding WebRTC may be found in WebRTC: APIs and RTCWEB Protocols of the HTML5 Real-Time Web," by Alan B. Johnston and Daniel C. Burnett, $2^{nd}$ Edition (2013 Digital Codex LLC), which is incorporated herein in its entirety by reference.

WebRTC provides built-in capabilities for establishing real-time video, audio, and/or data streams in both point-to-point interactive sessions and multi-party interactive sessions. The WebRTC standards are currently under joint development by the World Wide Web Consortium (W3C) and the Internet Engineering Task Force (IETF). Information on the current state of WebRTC standards can be found at, e.g., http://www.w3c.org and http://www.ietf.org.

To establish a WebRTC interactive flow (e.g., a real-time video, audio, and/or data exchange), two WebRTC clients may retrieve WebRTC-enabled web applications, such as HTML5/JavaScript web applications, from a WebRTC application server. Through the web applications, the two WebRTC clients then engage in dialogue for initiating a peer connection over which the WebRTC interactive flow will pass. The initiation dialogue may include a media negotiation used to reach an agreement on parameters that define characteristics of the WebRTC interactive flow. Once the initiation dialogue is complete, the WebRTC clients may then establish a direct peer connection with one another, and may begin an exchange of media and/or data packets transporting real-time communications. The peer connection between the WebRTC clients typically employs the Secure Real-time Transport Protocol (SRTP) to transport real-time media flows, and may utilize various other protocols for real-time data interchange.

The WebRTC clients may be connected using a "full mesh" topology, in which each WebRTC client participating in the real-time communications establishes a peer connection with every other participating WebRTC client. In some circumstances, though, a full mesh topology may be prohibitively expensive in terms of network bandwidth and/or computing resources. As an alternative to a full mesh topology, each of the WebRTC clients may connect to a central media server, which mixes and distributes the WebRTC interactive flows to the participating WebRTC clients. The media server may also provide various types of media processing functionality (e.g., inserting announcements into, recording, switching, and/or redirecting WebRTC interactive flows, as non-limiting examples) that are accessible by the WebRTC application. However, conventional media servers typically require developers to be familiar with control interfaces that are based on Session Initiation Protocol (SIP) or other protocols outside the scope of expertise of many WebRTC application developers. As a result, developers may face a steep learning curve, which may present an obstacle to implementation of WebRTC applications utilizing media server functionality.

SUMMARY OF THE DETAILED DESCRIPTION

Embodiments disclosed in the detailed description include providing Web Real-Time Communications (WebRTC) media services via WebRTC-enabled media servers. Related methods, systems, and computer-readable media are also disclosed. In this regard, in one embodiment, a WebRTC-enabled media server provides media services by implementing a standard WebRTC client application programming interface (API). The WebRTC-enabled media server provides a scripting engine, a WebRTC functionality provider, and a control API for accessing a functionality of the WebRTC functionality provider. Together, these elements allow the WebRTC-enabled media server to interact with WebRTC peers, in much the same way as a conventional WebRTC client, while simultaneously providing media server functionality. The WebRTC-enabled media server receives a stream establishment application from a WebRTC application server. The stream establishment application may comprise one or more JavaScript web applications, as a non-limiting example. The WebRTC-enabled media server uses the stream establishment application to establish WebRTC interactive flows with multiple WebRTC clients, and applies a media service to one or more of the WebRTC interactive flows to generate one or more media server flows. The one or more media server flows is then provided to one or more of the WebRTC clients. The media service may be applied to the one or more WebRTC interactive flows in response to media server commands that the WebRTC-enabled media server receives from the WebRTC application server via the control API. The WebRTC-enabled media server may also generate media server events as a result of applying the media service, and may provide the media server events to the WebRTC application server via the control API. In this manner, media processing functionality of the WebRTC-enabled media server may be accessed by the WebRTC application server through the use of interfaces familiar to WebRTC application developers.

In another embodiment, a system for providing WebRTC media services includes at least one communications interface and a WebRTC-enabled media server. The WebRTC-enabled media server comprises a scripting engine and a WebRTC functionality provider, and is communicatively coupled to a WebRTC application server and a plurality of WebRTC clients via the at least one communications interface. The WebRTC-enabled media server is configured to provide a control API for accessing a functionality of the WebRTC functionality provider. The WebRTC-enabled media server is also configured to receive, from the WebRTC application server, a stream establishment application. The WebRTC-enabled media server is additionally configured to establish, via the stream establishment application, a plurality of WebRTC interactive flows associated with corresponding ones of the plurality of WebRTC clients. The WebRTC-enabled media server is also configured to apply a media service to one or more of the plurality of WebRTC interactive flows to generate one or more media server flows. The WebRTC-enabled media server is additionally configured to provide the one or more media server flows to one or more of the plurality of WebRTC clients.

In another embodiment, a method for providing WebRTC media services is provided. The method comprises providing, by a WebRTC-enabled media server executing on a computing device, a control API for accessing a functionality of a WebRTC functionality provider of the WebRTC-enabled media server. The method also comprises receiving, by the WebRTC-enabled media server, a stream establishment application from a WebRTC application server. The method further comprises establishing, via the stream establishment application, a plurality of WebRTC interactive flows associated with corresponding ones of a plurality of WebRTC clients. The method also comprises applying a media service to one or more of the plurality of WebRTC interactive flows to generate one or more media server flows. The method additionally comprises providing the one or more media server flows to one or more of the plurality of WebRTC clients.

In another embodiment, a non-transitory computer-readable medium having stored thereon computer-executable instructions to cause a processor to implement a method for providing WebRTC media services is provided. The method implemented by the computer-executable instructions comprises providing, by a WebRTC-enabled media server, a control API for accessing a functionality of a WebRTC functionality provider of the WebRTC-enabled media server. The method implemented by the computer-executable instructions also comprises receiving, by the WebRTC-enabled media server, a stream establishment application from a WebRTC application server. The method implemented by the computer-executable instructions further comprises establishing, via the stream establishment application, a plurality of WebRTC interactive flows associated with corresponding ones of a plurality of WebRTC clients. The method implemented by the computer-executable instructions also comprises applying a media service to one or more of the plurality of WebRTC interactive flows to generate one or more media server flows. The method implemented by the computer-executable instructions additionally comprises providing the one or more media server flows to one or more of the plurality of WebRTC clients.

BRIEF DESCRIPTION OF THE FIGURES

The accompanying drawing figures incorporated in and forming a part of this specification illustrate several aspects of the disclosure, and together with the description serve to explain the principles of the disclosure.

DETAILED DESCRIPTION

Figure 1:
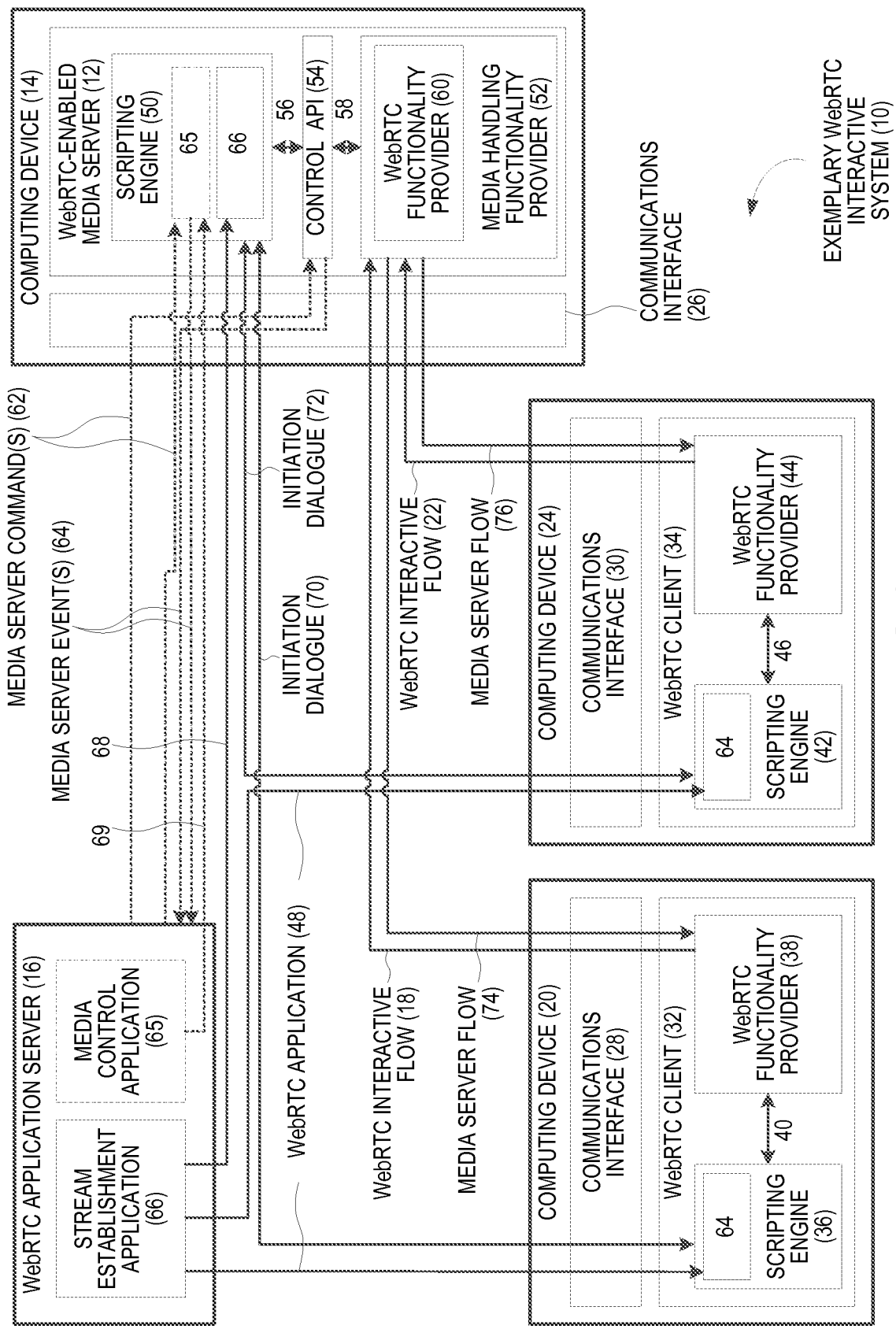
FIG. 1 is a conceptual diagram illustrating a Web Real-Time Communications (WebRTC) interactive session between two WebRTC clients using a WebRTC-enabled media server.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include providing Web Real-Time Communications (WebRTC) media services via WebRTC-enabled media servers. Related methods, systems, and computer-readable media are also disclosed. In this regard, in one embodiment, a WebRTC-enabled media server provides media services by implementing a standard WebRTC client application programming interface (API). The WebRTC-enabled media server provides a scripting engine, a WebRTC functionality provider, and a control API for accessing a functionality of the WebRTC functionality provider. Together, these elements allow the WebRTC-enabled media server to interact with WebRTC peers, in much the same way as a conventional WebRTC client, while simultaneously providing media server functionality. The WebRTC-enabled media server receives a stream establishment application from a WebRTC application server. The stream establishment application may comprise one or more JavaScript web applications, as a non-limiting example. The WebRTC-enabled media server uses the stream establishment application to establish WebRTC interactive flows with multiple WebRTC clients, and applies a media service to one or more of the WebRTC interactive flows to generate one or more media server flows. The one or more media server flows is then provided to one or more of the WebRTC clients. The media service may be applied to the one or more WebRTC interactive flows in response to media server commands that the WebRTC-enabled media server receives from the WebRTC application server via the control API. The WebRTC-enabled media server may also generate media server events as a result of applying the media service, and may provide the media server events to the WebRTC application server via the control API. In this manner, media processing functionality of the WebRTC-enabled media server may be accessed by the WebRTC application server through the use of interfaces familiar to WebRTC application developers.

In another embodiment, a system for providing WebRTC media services includes at least one communications interface and a WebRTC-enabled media server. The WebRTC-enabled media server comprises a scripting engine and a WebRTC functionality provider, and is communicatively coupled to a WebRTC application server and a plurality of WebRTC clients via the at least one communications interface. The WebRTC-enabled media server is configured to provide a control API for accessing a functionality of the WebRTC functionality provider. The WebRTC-enabled media server is also configured to receive, from the WebRTC application server, a stream establishment application. The WebRTC-enabled media server is additionally configured to establish, via the stream establishment application, a plurality of WebRTC interactive flows associated with corresponding ones of the plurality of WebRTC clients. The WebRTC-enabled media server is also configured to apply a media service to one or more of the plurality of WebRTC interactive flows to generate one or more media server flows. The WebRTC-enabled media server is additionally configured to provide the one or more media server flows to one or more of the plurality of WebRTC clients.

FIG. 1 illustrates an exemplary WebRTC interactive system 10 for providing WebRTC media services via WebRTC-enabled media servers as disclosed herein. In particular, the exemplary WebRTC interactive system 10 provides a WebRTC-enabled media server 12 that executes on a computing device 14. The WebRTC-enabled media server 12 is configured to establish WebRTC interactive sessions with WebRTC peers in a manner similar to a conventional WebRTC client, and is further configured to provide media services to a WebRTC application server 16. As used herein, a "WebRTC interactive session" refers to operations for carrying out a WebRTC offer/answer exchange, establishing a peer connection, and commencing a WebRTC interactive flow between two or more endpoints (e.g., two or more WebRTC clients). A "WebRTC interactive flow," as disclosed herein, refers to an interactive media flow and/or an interactive data flow that passes between or among two or more endpoints according to the WebRTC standards and protocols known in the art. As non-limiting examples, an interactive media flow constituting a WebRTC interactive flow may comprise a real-time audio stream and/or a real-time video stream, or other real-time media or data streams. Data and/or media comprising a WebRTC interactive flow may be collectively referred to herein as "content."

For purposes of illustration, a WebRTC interactive flow 18 is shown in FIG. 1 as passing between the computing device 14 and a computing device 20, and a WebRTC interactive flow 22 is shown as passing between the computing device 14 and a computing device 24. It is to be understood that the computing devices 14, 20, and 24 may all be located within the same public or private network, or may be located within separate, communicatively coupled public or private networks. Some embodiments of the WebRTC interactive system 10 of FIG. 1 may provide that each of the computing devices 14, 20, and 24 may be any computing device having network communications capabilities, such as a smartphone, a tablet computer, a dedicated web appliance, a media server, a desktop or server computer, or a purpose-built communications device, as non-limiting examples. The computing devices 14, 20, and 24 include communications interfaces 26, 28, and 30, respectively, for connecting the computing devices 14, 20, and 24 to one or more public and/or private networks. In some embodiments, the elements of the computing devices 14, 20, and 24 may be distributed across more than one computing device 14, 20, and 24.

The computing devices 20 and 24 of FIG. 1 include WebRTC clients 32 and 34, respectively. Each of the WebRTC clients 32 and 34 may be a WebRTC-enabled web browser application, a dedicated communications application, a mobile application, or an interface-less application, such as a daemon or service application, as non-limiting examples. In this embodiment, the WebRTC client 32 comprises a scripting engine 36 and a WebRTC functionality provider 38. The scripting engine 36 enables client-side applications written in a scripting language, such as JavaScript, to be executed within the WebRTC client 32. The scripting engine 36 also provides an API to facilitate communications with other functionality providers within the WebRTC client 32 and/or the computing device 20, and/or with other web clients, user devices, or web servers. The WebRTC functionality provider 38 implements the protocols, codecs, and APIs necessary to enable real-time communications via WebRTC. The scripting engine 36 and the WebRTC functionality provider 38 are communicatively coupled via a set of defined APIs, as indicated by bidirectional arrow 40. The WebRTC client 34 also includes a scripting engine 42 and a WebRTC functionality provider 44 for providing functionality similar to that of the scripting engine 36 and the WebRTC functionality provider 38, respectively, of the WebRTC client 32. The scripting engine 42 and the WebRTC functionality provider 44 of the WebRTC client 34 are communicatively coupled via a set of defined APIs, as indicated by bidirectional arrow 46.

To establish a WebRTC interactive session, the WebRTC client 32 and the WebRTC client 34 each downloads a WebRTC application 48 from the WebRTC application server 16 (e.g., via Hyper Text Transfer Protocol (HTTP)/Hyper Text Transfer Protocol Secure (HTTPS) connections). In some embodiments, the WebRTC application 48 may comprise an HTML5/JavaScript web application that provides a rich user interface using HTML5, and uses JavaScript to handle user input and to communicate with the WebRTC application server 16. It is to be understood that the WebRTC application 48 may comprise multiple, interoperable WebRTC applications tailored for specific characteristics (such as operating systems and/or platforms) of the WebRTC clients 32 and 34.

In a typical peer-to-peer architecture, the WebRTC client 32 and the WebRTC client 34 engage in an initiation dialogue (not shown) with one another to negotiate media types and capabilities of the desired WebRTC interactive session. In some embodiments, the initiation dialogue may include a WebRTC offer/answer exchange in which WebRTC session description objects (not shown) are exchanged between the WebRTC clients 32 and 34 via the WebRTC application server 16. After the initiation dialogue is complete, a WebRTC interactive flow is established directly between the WebRTC client 32 and the WebRTC client 34 via a peer connection. In some embodiments, the WebRTC client 32 and the WebRTC client 34 may each connect to a conventional media server (not shown). The conventional media server may mix and distribute WebRTC interactive flows to the WebRTC clients 32 and 34, and may provide other media processing functionality such as inserting announcements into, recording, and/or redirecting the WebRTC interactive flows, as non-limiting examples. However, a conventional media server may require developers to be familiar with control interfaces based on protocols (e.g., Session Initiation Protocol (SIP)) that may be outside the scope of expertise of many WebRTC application developers.

In this regard, the WebRTC-enabled media server 12 is provided to establish WebRTC interactive sessions with WebRTC peers in a manner similar to a conventional WebRTC client, and to provide media services to the WebRTC application server 16 using an interface more accessible to WebRTC application developers. The WebRTC-enabled media server 12 provides a scripting engine 50 and a media handling functionality provider 52. The WebRTC-enabled media server 12 also provides a control API 54, through which a functionality of the media handling functionality provider 52 may be accessed and controlled. In some embodiments, the scripting engine 50 and the media handling functionality provider 52 may be communicatively coupled to each other via the control API 54 as indicated by bidirectional arrows 56 and 58.

The scripting engine 50 of the WebRTC-enabled media server 12 provides functionality corresponding to that of the scripting engines 36 and 42 of the WebRTC clients 32 and 34, respectively. The media handling functionality provider 52 includes a WebRTC functionality provider 60, which provides functionality corresponding to that of the WebRTC functionality providers 38 and 44 of the WebRTC clients 32 and 34, respectively. The media handling functionality provider 52 also provides media processing functionality similar to that provided by conventional media servers. The control API 54 defines one or more media server commands 62 that the WebRTC-enabled media server 12 may receive from the WebRTC application server 16 to apply media services to WebRTC interactive flows. The control API 54 may further specify one or more media server events 64 that the WebRTC-enabled media server 12 may generate to notify the WebRTC application server 16 of relevant occurrences during or resulting from applying the media services. The control API 54 may comprise a Web-accessible API configured to receive the media server commands 62 from and/or provide the media server events 64 to the WebRTC application server 16. As a non-limiting example, the control API 54 may include a Representational State Transfer (REST) API and/or a JavaScript API. In some embodiments in which the control API 54 comprises a JavaScript API, the control API 54 may receive the media server commands 62 and/or provide the media server events 64 via a media control application 65 executed by the scripting engine 50.

As seen in FIG. 1, the WebRTC-enabled media server 12 is configured to receive a stream establishment application 66 from the WebRTC application server 16, as indicated by arrow 68. Some embodiments may provide that the WebRTC-enabled media server 12 also receives the media control application 65 from the WebRTC application server 16, as indicated by arrow 69. The stream establishment application 66 and/or the media control application 65 may each comprise a JavaScript application, as a non-limiting example. In some embodiments, the stream establishment application 66 and/or the media control application 65 are downloaded upon startup of the WebRTC-enabled media server 12, and/or upon association of the WebRTC-enabled media server 12 with the WebRTC application server 16. Some embodiments may provide that a same version of the stream establishment application 66 and/or the media control application 65 may be used by more than one WebRTC application server 16, and/or a custom version of the stream establishment application 66 and/or the media control application 65 may be used by one or more WebRTC application servers 16. The download location for the stream establishment application 66 and/or the media control application 65 may be specified by a value set within the WebRTC-enabled media server 12 prior to or during execution of the WebRTC-enabled media server 12, or may be set by a web service invocation from the WebRTC application server 16.

The stream establishment application 66 provides functionality for establishing the WebRTC interactive flows 18 and 22 between the WebRTC-enabled media server 12 and the WebRTC clients 32 and 34. In some embodiments, the stream establishment application 66 may also be downloaded from the WebRTC application server 16 by the WebRTC client 32 and the WebRTC client 34 as part of the WebRTC application 48. The stream establishment application 66 downloaded by the WebRTC clients 32 and 34 and the WebRTC-enabled media server 12 may be the same application across all platforms and devices, or different platform- or device-specific versions of the stream establishment application 66 may be provided. In some embodiments, the stream establishment application 66 may be downloaded by the WebRTC clients 32 and 34 each time a WebRTC interactive session is to be established.

Using the scripting engine 50 and the media handling functionality provider 52, the WebRTC-enabled media server 12 may interact with the WebRTC clients 32 and 34 to establish the WebRTC interactive flows 18 and 22. In the example of FIG. 1, the stream establishment application 66, downloaded by the WebRTC clients 32 and 34 as part of the WebRTC application 48, directs the WebRTC clients 32 and 34 to engage in initiation dialogues 70 and 72, respectively, with the WebRTC-enabled media server 12. In response to the initiation dialogues 70 and 72, the scripting engine 50 of the WebRTC-enabled media server 12 employs the stream establishment application 66 to establish the WebRTC interactive flows 18 and 22 with the respective WebRTC clients 32 and 34. To further facilitate interoperability with the WebRTC application server 16 and the WebRTC clients 32 and 34, the WebRTC-enabled media server 12 may provide support for standard transport mechanisms (e.g., WebSockets, as a non-limiting example), as well as mechanisms required by WebRTC specifications such as Interactive Connectivity Establishment (ICE), Session Traversal Utilities for Network Address Translation (STUN), and/or Traversal Using Relays around Network Address Translation (TURN).

After the WebRTC interactive flows 18 and 22 are established, the media handling functionality provider 52 of the WebRTC-enabled media server 12 may apply a media service to content of incoming media and/or data streams received from one or more of the WebRTC interactive flows 18 and 22 to generate one or more of outgoing media server flows 74 and 76. In the example of FIG. 1, the media handling functionality provider 52 may be controlled by the WebRTC application server 16 via the control API 54, and/or may be controlled by the media control application 65 executed by the scripting engine 50 of the WebRTC-enabled media server 12. As non-limiting examples, applying the media service may include mixing the WebRTC interactive flows 18 and 22, switching the media server flows 74 and 76, inserting content into one or more of the WebRTC interactive flows 18 and 22, recording one or more of the WebRTC interactive flows 18 and 22, redirecting one or more of the WebRTC interactive flows 18 and 22, performing text-to-speech conversion on one or more of the WebRTC interactive flows 18 and 22, and/or performing speech recognition on one or more of the WebRTC interactive flows 18 and 22.

In some embodiments, operation of the WebRTC functionality provider 60 of the WebRTC-enabled media server 12 may be controlled by the media server command(s) 62 received from the WebRTC application server 16. The media server command(s) 62 may be received via an HTTP request (such as an HTTP GET request) and/or via WebSockets signaling. In some embodiments, the media server command(s) 62 may comprise a REST API invocation received by the control API 54 from the WebRTC application server 16. According to some embodiments, the media server command(s) 62 may comprise a JavaScript API invocation received by the media control application 65 from the WebRTC application server 16 and relayed to the control API 54.

Some embodiments may provide that the WebRTC functionality provider 60 of the WebRTC-enabled media server 12 generates the media server event(s) 64 as a result of applying the media service to the WebRTC interactive flows 18 and 22. For example, the WebRTC-enabled media server 12 may notify the WebRTC application server 16 that an announcement has completed, or that input of dual-tone multi-frequency (DTMF) digits has been detected. The media server event(s) 64 may be sent to the WebRTC application server 16 via an HTTP request (such as an HTTP POST request) or by WebSockets, as non-limiting examples. In some embodiments, the media server event(s) 64 may be provided to the WebRTC application server 16 via a REST API by the control API 54. According to some embodiments, the media server event(s) 64 may be provided to the WebRTC application server 16 via a JavaScript API of the media control application 65.

The specific content and format of the media server command(s) 62 and the media server event(s) 64 may be determined by the control API 54 and/or may specified by the media control application 65. In some embodiments, the control API 54 may accept standard WebRTC objects, such as a PeerConnection object, as parameters. The control API 54 may be based on APIs such as Java Specification Request (JSR) 309, as a non-limiting example.

It is to be understood that the WebRTC-enabled media server 12 may provide media services concurrently to multiple WebRTC application servers 16. For example, the WebRTC-enabled media server 12 may receive, and concurrently execute, a unique stream establishment application 66 and/or a unique media control application 65 for each of multiple WebRTC application servers 16. In some embodiments, the WebRTC-enabled media server 12 may provide a separate instance of the scripting engine 50 and/or the media handling functionality provider 52 for each of multiple concurrent WebRTC interactive sessions.

Figure 2:
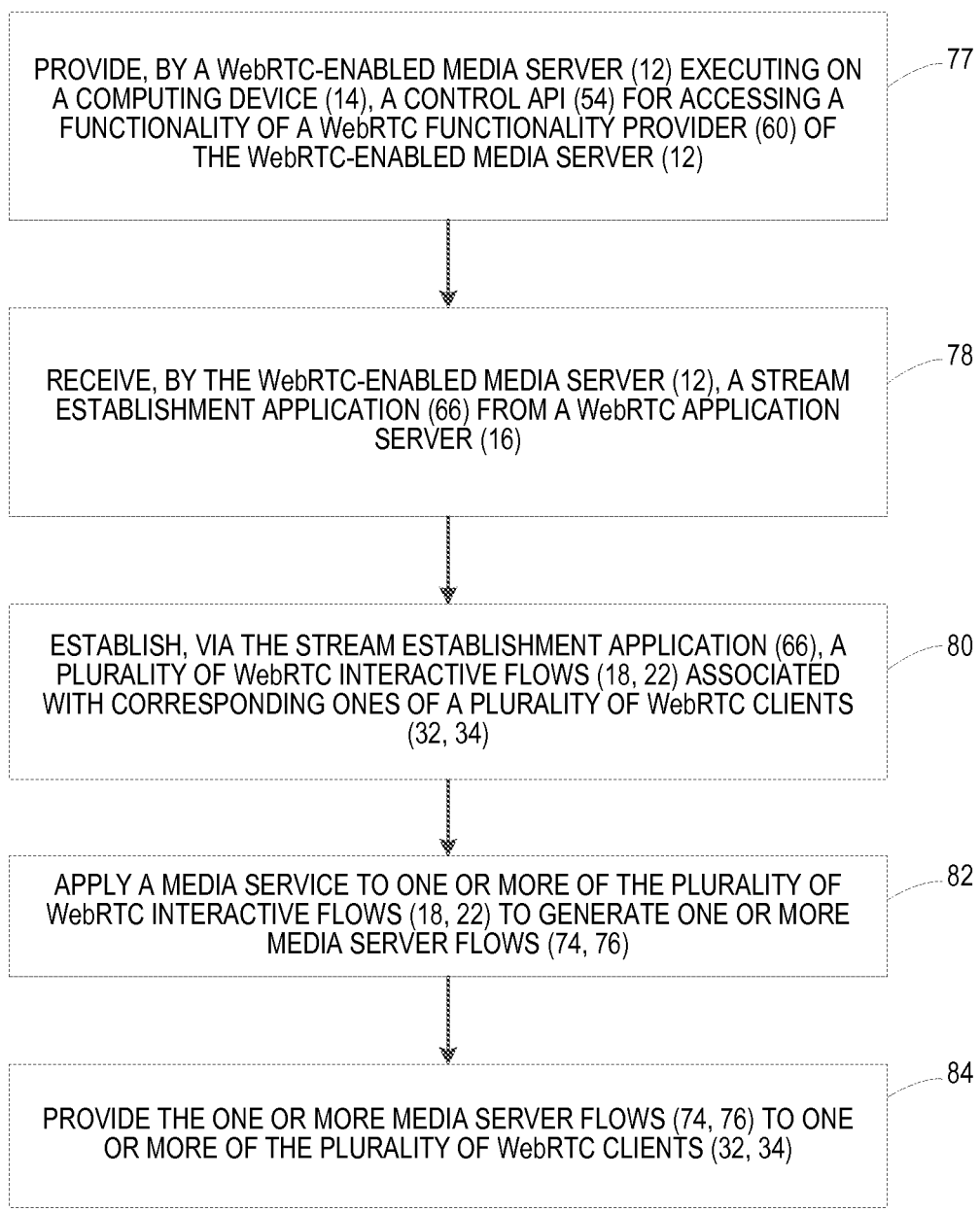
FIG. 2 is a flowchart illustrating exemplary operations of the WebRTC-enabled media server of FIG. 1 for providing WebRTC media services.

To generally describe exemplary operations of the WebRTC-enabled media server 12 of FIG. 1 for providing WebRTC media services, FIG. 2 is provided. For the sake of clarity, elements of FIG. 1 are referenced in describing FIG. 2. In the example of FIG. 2, operations begin with the WebRTC-enabled media server 12, executing on the computing device 14, providing the control API 54 for accessing a functionality of the WebRTC functionality provider 60 of the WebRTC-enabled media server 12 (block 77). The control API 54 specifies the media server command(s) 62 that may be received from the WebRTC application server 16, as well as the media server event(s) 64 that may be generated by the WebRTC-enabled media server 12. The WebRTC-enabled media server 12 then receives the stream establishment application 66 from the WebRTC application server 16 (block 78). The stream establishment application 66 enables the WebRTC-enabled media server 12 to establish the WebRTC interactive flows 18 and 22 with the WebRTC clients 32 and 34.

The WebRTC-enabled media server 12 next establishes a plurality of WebRTC interactive flows 18, 22, each of which is associated with a respective one of a plurality of WebRTC clients 32, 34, via the stream establishment application 66 (block 80). According to some embodiments provided herein, the WebRTC interactive flows 18 and 22 may be established in response to the initiation dialogues 70 and 72 that are initiated by the WebRTC clients 32 and 34, respectively, or in response to initiation dialogues (not shown) that are initiated by the WebRTC-enabled media server 12. Some embodiments may provide that the initiation dialogues 70 and 72 are initiated at the direction of the WebRTC application 48 and/or the WebRTC application server 16.

Once the plurality of WebRTC interactive flows 18, 22 is established, the WebRTC-enabled media server 12 applies a media service to one or more of the plurality of WebRTC interactive flows 18, 22 to generate one or more media server flows 74, 76 (block 82). The media server flows 74, 76 may include data from either or both of the WebRTC interactive flows 18, 22, and/or additional content (such as an announcement) inserted into the WebRTC interactive flows 18, 22 by the WebRTC-enabled media server 12. The WebRTC-enabled media server 12 then provides the one or more media server flows 74, 76 to one or more of the plurality of WebRTC clients 32, 34 (block 84). In this manner, the WebRTC-enabled media server 12 may provide a usable, intuitive interface to WebRTC application developers for providing media functionality to the WebRTC application server 16.

Figure 3:
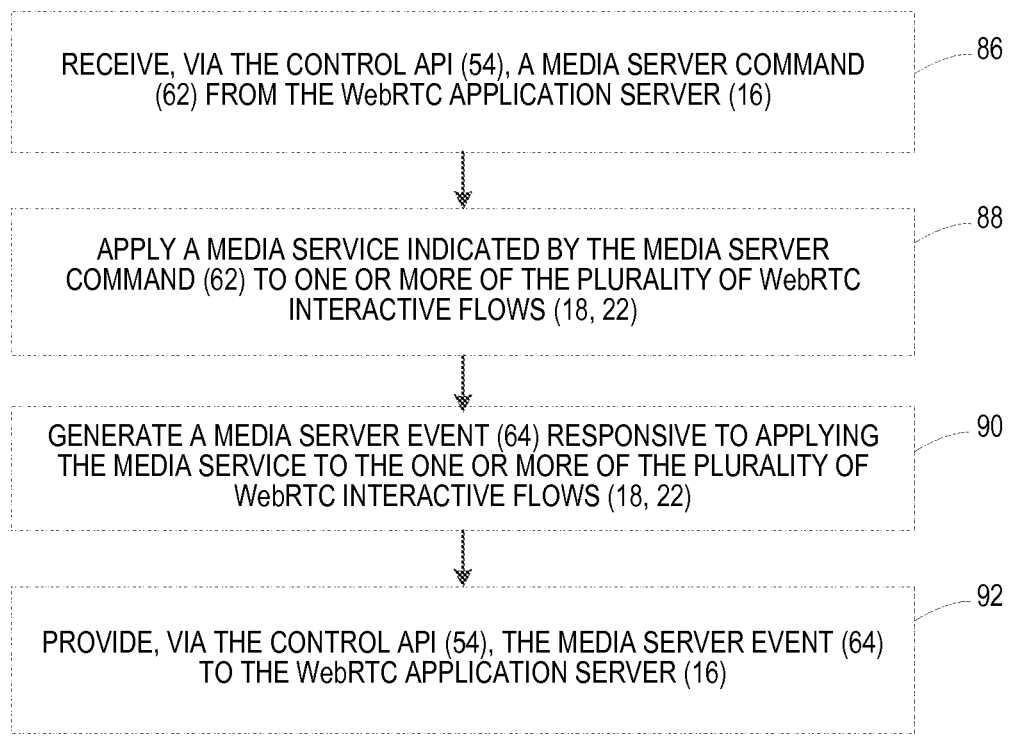
FIG. 3 is a flowchart illustrating further exemplary operations, in addition to the operations of FIG. 2, for providing WebRTC media services via the WebRTC-enabled media server of FIG. 1.

FIG. 3 is a flowchart illustrating optional exemplary operations, in addition to the operations of FIG. 2, for providing WebRTC media services via the WebRTC-enabled media server 12 of FIG. 1. As seen in FIG. 3, the WebRTC-enabled media server 12 may receive, via the control API 54, a media server command 62 from the WebRTC application server 16 (block 86). The media server command 62 may be received via an HTTP request (such as an HTTP GET request) and/or via WebSockets signaling, and may indicate a media service requested by the WebRTC application server 16. In some embodiments, the media server command 62 may be received via a REST API invocation and/or a JavaScript API invocation. The WebRTC-enabled media server 12 may thus apply a media service indicated by the media server command 62 to one or more of the WebRTC interactive flows 18, 22 (block 88).

The WebRTC-enabled media server 12 may also generate a media server event 64 as a result of applying the media service to the one or more of the plurality of WebRTC interactive flows 18, 22 (block 90). For instance, the WebRTC-enabled media server 12 may generate a media server event 64 to notify the WebRTC application server 16 that an announcement has completed, or that input of DTMF digits has been detected. In some embodiments, the media server event 64 may be provided via a REST API and/or a JavaScript API. The WebRTC-enabled media server 12 may then provide the media server event 64 to the WebRTC application server 16 via the control API 54 (block 92).

Figure 4:
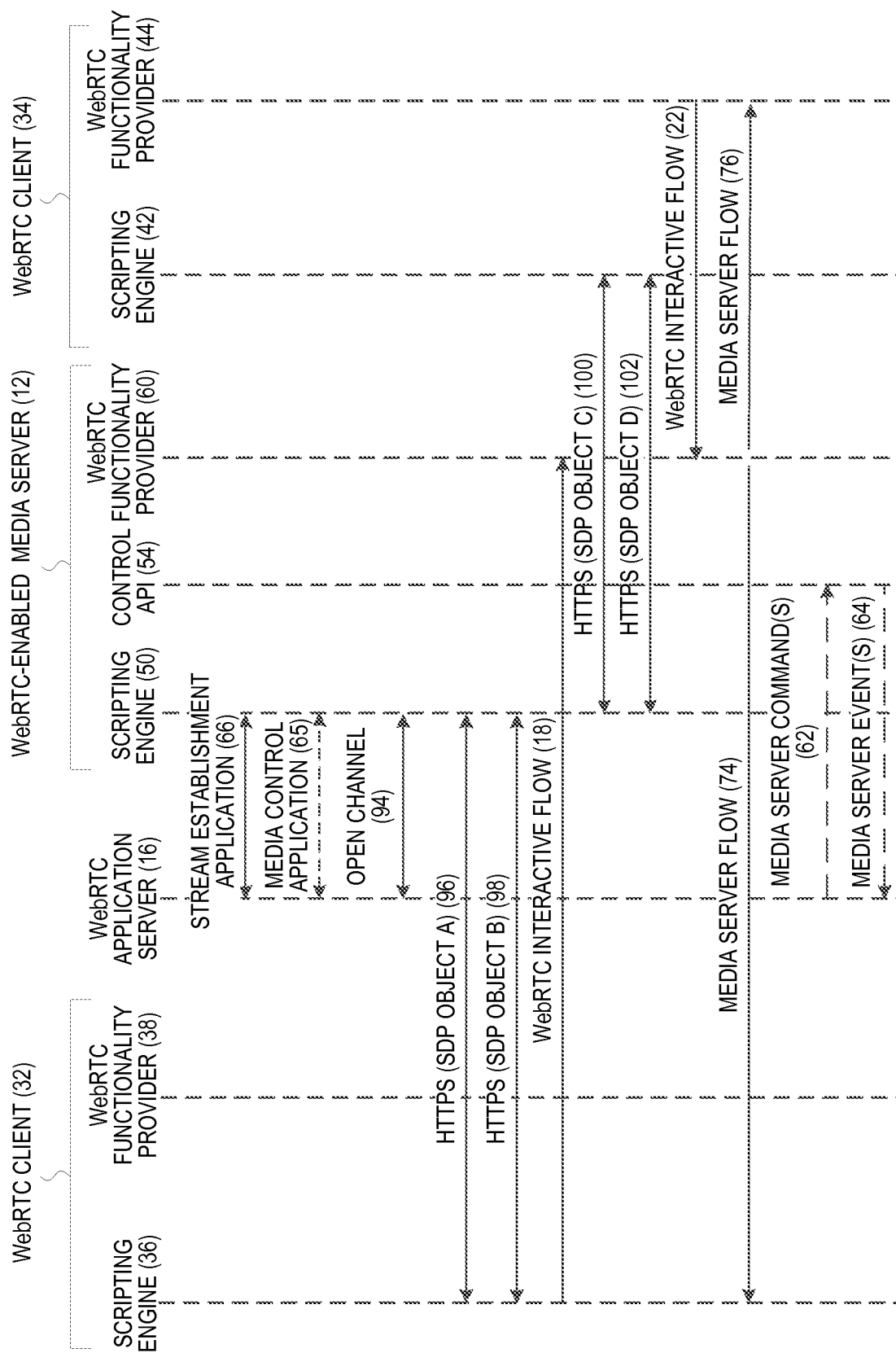
FIG. 4 is a diagram illustrating exemplary communications flows within an exemplary system including the WebRTC-enabled media server of FIG. 1.

To illustrate exemplary communications flows during the establishment of a WebRTC interactive session and the provision of media services using the WebRTC-enabled media server 12 of FIG. 1, FIG. 4 is provided. In FIG. 4, the scripting engine 36 and the WebRTC functionality provider 38 of the WebRTC client 32, the WebRTC application server 16, the scripting engine 50, the control API 54, and the WebRTC functionality provider 60 of the WebRTC-enabled media server 12, and the scripting engine 42 and the WebRTC functionality provider 44 of the WebRTC client 34 are each represented by vertical dotted lines. It is to be understood for this example that the WebRTC client 32 and the WebRTC client 34 have each downloaded a WebRTC-enabled application, such as the WebRTC application 48, from the WebRTC application server 16. It is to be further understood that the WebRTC-enabled application downloaded by each of the WebRTC clients 32 and 34 includes the stream establishment application 66.

As seen in FIG. 4, the scripting engine 50 of the WebRTC-enabled media server 12 first downloads the stream establishment application 66 from the WebRTC application server 16. For embodiments in which the WebRTC application server 16 controls the WebRTC functionality provider 60 via a JavaScript API, the scripting engine 50 may also optionally download the media control application 65 from the WebRTC application server 16. The scripting engine 50 may download the stream establishment application 66 and/or the media control application 65 based on a download location set within the WebRTC-enabled media server 12 prior to or during execution of the WebRTC-enabled media server 12, or set by a web service invocation (not shown) from the WebRTC application server 16.66

The WebRTC-enabled media server 12 then creates an open channel 94 to the WebRTC application server 16, through which the WebRTC application server 16 may request media services. In some embodiments, the open channel 94 may be created using an HTTP request (such as an HTTP GET request), or may be created using WebSockets. It is to be understood that multiple open channels 94 may be maintained by the WebRTC-enabled media server 12, thus enabling multiple concurrent media service requests to be handled.

Next, the establishment of a WebRTC interactive session between the WebRTC client 32 and the WebRTC-enabled media server 12 begins with the scripting engine 36 of the WebRTC client 32 sending a WebRTC session description object to the scripting engine 50 of the WebRTC-enabled media server 12 via an HTTPS connection. In this example, the WebRTC session description object is a Session Description Protocol (SDP) object, and is referred to as SDP Object A (arrow 96). SDP Object A represents the "offer" in a WebRTC offer/answer exchange, and specifies the media types and capabilities that the WebRTC client 32 supports and prefers for use in the WebRTC interactive session. After the scripting engine 50 of the WebRTC-enabled media server 12 receives the SDP Object A from the WebRTC client 32, the scripting engine 50 sends a WebRTC session description object in response, referred to as SDP Object B (arrow 98), via HTTPS to the WebRTC client 32. The SDP Object B in this example represents the "answer" in the WebRTC offer/answer exchange. The WebRTC interactive flow 18 is then established between the WebRTC client 32 and the WebRTC-enabled media server 12. Establishing the WebRTC interactive flow 18 may include "hole punching" to determine the best way to establish direct communications, as well as key negotiations to establish secure connections. It is to be understood that establishing the WebRTC interactive flow 18 may be accomplished through operations of the stream establishment application 66 executed by the scripting engine 50 of the WebRTC-enabled media server 12 and the scripting engine 36 of the WebRTC client 32.

With continuing reference to FIG. 4, a WebRTC interactive session is also established between the WebRTC client 34 and the WebRTC-enabled media server 12. It is to be understood that operations for establishing a WebRTC interactive session between the WebRTC client 34 and the WebRTC-enabled media server 12 may occur before, concurrently with, or after the establishment of the WebRTC interactive flow 18 between the WebRTC client 32 and the WebRTC-enabled media server 12. As seen in FIG. 4, the scripting engine 42 of the WebRTC client 34 sends a WebRTC session description object to the scripting engine 50 of the WebRTC-enabled media server 12 via an HTTPS connection. The WebRTC session description object in this example is a SDP object referred to as SDP Object C (arrow 100), and specifies the media types and capabilities supported and/or preferred for use by the WebRTC client 34. In response to receiving the SDP Object C from the WebRTC client 34, the scripting engine 50 sends a WebRTC session description object, referred to as SDP Object D (arrow 102), via HTTPS to the WebRTC client 34. The SDP Object D represents the "answer" in the WebRTC offer/answer exchange. Based on the offer/answer exchange, the WebRTC interactive flow 22 is then established between the WebRTC client 34 and the WebRTC-enabled media server 12. It is to be understood that establishing the WebRTC interactive flow 22 may be accomplished through operations of the stream establishment application 66 being executed by the scripting engine 50 of the WebRTC-enabled media server 12 and the scripting engine 42 of the WebRTC client 34.

After the WebRTC interactive flows 18 and 22 are established, the WebRTC-enabled media server 12 generates one or more media server flows 74 and 76 by applying media services to one or more of the WebRTC interactive flows 18 and 22, and provides the one or more media server flows 74 and 76 to the WebRTC clients 32 and 34, respectively. As noted above, applying media services may include mixing the WebRTC interactive flows 18 and 22, switching the media server flows 74 and 76, inserting content into one or more of the WebRTC interactive flows 18 and 22, recording one or more of the WebRTC interactive flows 18 and 22, redirecting one or more of the WebRTC interactive flows 18 and 22, performing text-to-speech conversion on one or more of the WebRTC interactive flows 18 and 22, and/or performing speech recognition on one or more of the WebRTC interactive flows 18 and 22.

In some embodiments, the WebRTC functionality provider 60 may receive the media server command(s) 62 from the WebRTC application server 16 via the control API 54. The media server command(s) 62 may be routed through the media control application 65 executed by the scripting engine 50. In this manner, the WebRTC application server 16 may indicate media services to be applied to the WebRTC interactive flows 18 and/or 22, and thus may selectively control, monitor, and/or modify a content of the media server flows 74 and/or 76 provided to the WebRTC clients 32 and 34. The WebRTC-enabled media server 12 may also generate the media server event(s) 64 in response to applying media services to the WebRTC interactive flows 18 and/or 22. As non-limiting examples, the WebRTC-enabled media server 12 may generate media server event(s) 64 to notify the WebRTC application server 16 that an announcement has completed, or that input of DTMF digits has been detected. The media server event(s) 64 may then be provided to the WebRTC application server 16 by the control API 54. In some embodiments, the media server event(s) 64 may be provided via the media control application 65 executed by the scripting engine 50.

Figure 5:
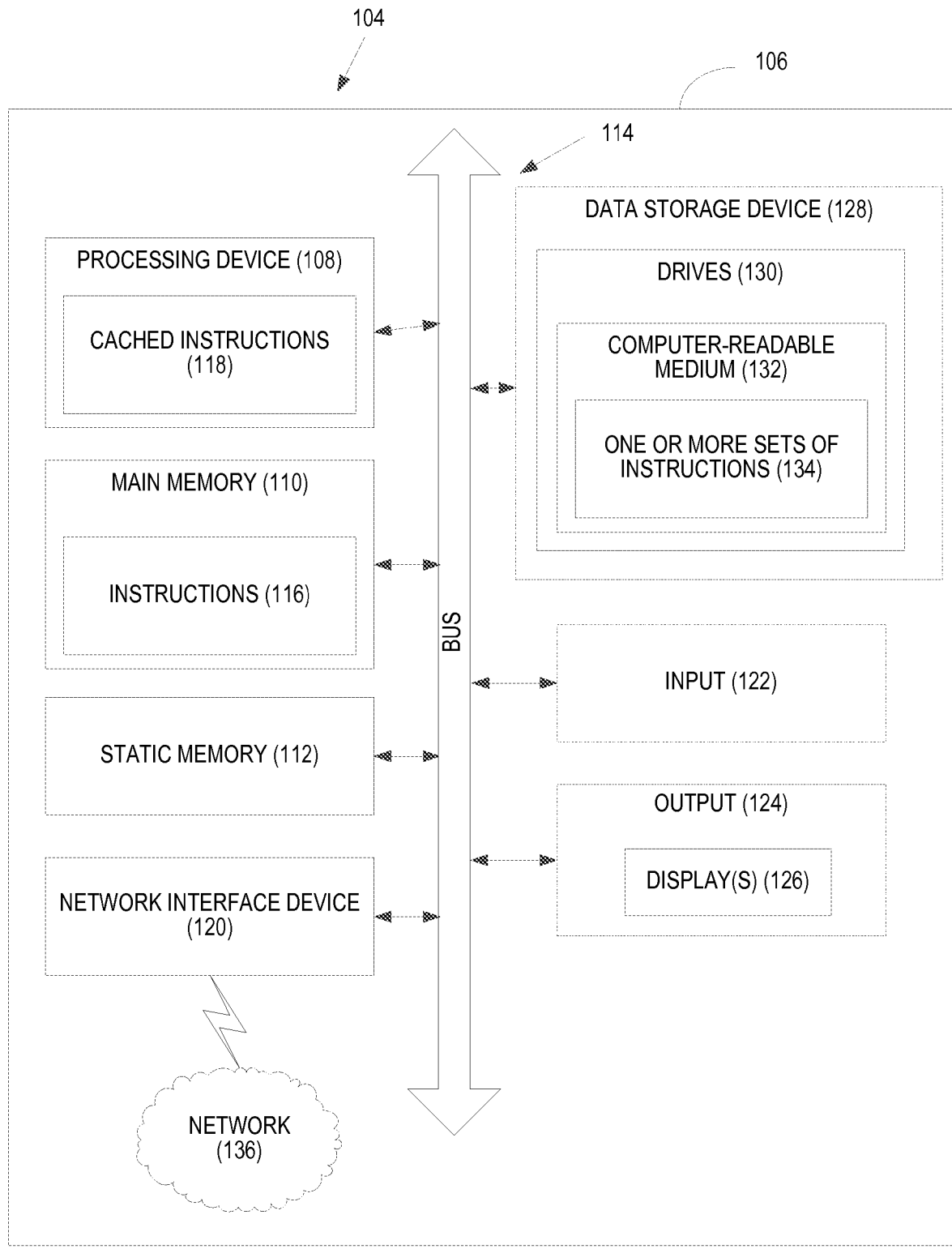
FIG. 5 is a block diagram of an exemplary processor-based system that may include the WebRTC-enabled media server of FIG. 1.

FIG. 5 provides a block diagram representation of a processing system 104 in the exemplary form of an exemplary computer system 106 adapted to execute instructions to perform the functions described herein. In some embodiments, the processing system 104 may execute instructions to perform the functions of the WebRTC-enabled media server 12 of FIG. 1. In this regard, the processing system 104 may comprise the computer system 106, within which a set of instructions for causing the processing system 104 to perform any one or more of the methodologies discussed herein may be executed. The processing system 104 may be connected (as a non-limiting example, networked) to other machines in a local area network (LAN), an intranet, an extranet, or the Internet. The processing system 104 may operate in a client-server network environment, or as a peer machine in a peer-to-peer (or distributed) network environment. While only a single processing system 104 is illustrated, the terms "controller" and "server" shall also be taken to include any collection of machines that individually or jointly execute a set (or multiple sets) of instructions to perform any one or more of the methodologies discussed herein. The processing system 104 may be a server, a personal computer, a desktop computer, a laptop computer, a personal digital assistant (PDA), a computing pad, a mobile device, or any other device and may represent, as non-limiting examples, a server or a user's computer.

The exemplary computer system 106 includes a processing device or processor 108, a main memory 110 (as non-limiting examples, read-only memory (ROM), flash memory, dynamic random access memory (DRAM) such as synchronous DRAM (SDRAM), etc.), and a static memory 112 (as non-limiting examples, flash memory, static random access memory (SRAM), etc.), which may communicate with each other via a bus 114. Alternatively, the processing device 108 may be connected to the main memory 110 and/or the static memory 112 directly or via some other connectivity means.

The processing device 108 represents one or more processing devices such as a microprocessor, central processing unit (CPU), or the like. More particularly, the processing device 108 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 108 is configured to execute processing logic in instructions 116 and/or cached instructions 118 for performing the operations and steps discussed herein.

The computer system 106 may further include a communications interface in the form of a network interface device 120. It also may or may not include an input 122 to receive input and selections to be communicated to the computer system 106 when executing the instructions 116, 118. It also may or may not include an output 124, including but not limited to display(s) 126. The display(s) 126 may be a video display unit (as non-limiting examples, a liquid crystal display (LCD) or a cathode ray tube (CRT)), an alphanumeric input device (as a non-limiting example, a keyboard), a cursor control device (as a non-limiting example, a mouse), and/or a touch screen device (as a non-limiting example, a tablet input device or screen).

The computer system 106 may or may not include a data storage device 128 that includes using drive(s) 130 to store the functions described herein in a computer-readable medium 132, on which is stored one or more sets of instructions 134 (e.g., software) embodying any one or more of the methodologies or functions described herein. The functions can include the methods and/or other functions of the processing system 104, a participant user device, and/or a licensing server, as non-limiting examples. The one or more sets of instructions 134 may also reside, completely or at least partially, within the main memory 110 and/or within the processing device 108 during execution thereof by the computer system 106. The main memory 110 and the processing device 108 also constitute machine-accessible storage media. The instructions 116, 118, and/or 134 may further be transmitted or received over a network 136 via the network interface device 120. The network 136 may be an intra-network or an inter-network.

While the computer-readable medium 132 is shown in an exemplary embodiment to be a single medium, the term "machine-accessible storage medium" should be taken to include a single medium or multiple media (as non-limiting examples, a centralized or distributed database, and/or associated caches and servers) that store the one or more sets of instructions 134. The term "machine-accessible storage medium" shall also be taken to include any medium that is capable of storing, encoding, or carrying a set of instructions for execution by the machine, and that cause the machine to perform any one or more of the methodologies disclosed herein. The term "machine-accessible storage medium" shall accordingly be taken to include, but not be limited to, solid-state memories, and optical and magnetic media.

The embodiments disclosed herein may be embodied in hardware and in instructions that are stored in hardware, and may reside, as non-limiting examples, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. As non-limiting examples, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A system for providing Web Real-Time Communications (WebRTC) media services, comprising:
at least one communications interface;
a processor; and
a computer readable medium coupled with the processor and comprising processor readable and executable instructions that program the processor to implement a WebRTC-enabled media server comprising a scripting engine, a WebRTC functionality provider, a control application program interface (API) providing an interface between the scripting engine and the WebRTC functionality provider, and a WebRTC client API, the WebRTC-enabled media server communicatively coupled to a WebRTC application server and a plurality of WebRTC clients via the at least one communications interface;

wherein the WebRTC-enabled media server:
  receives, from the WebRTC application server, a stream establishment application;
  establishes, via execution of the stream establishment application by the scripting engine and through the WebRTC client API, a plurality of WebRTC interactive flows associated with corresponding ones of the plurality of WebRTC clients through a WebRTC initiation dialogue between the stream establishment application of the Web-RTC-enabled media server and each of the plurality of WebRTC clients, wherein the WebRTC-enabled media server interacts through the WebRTC client API with the WebRTC clients as a WebRTC peer and provides media server functionality based on media server commands received from the WebRTC application server through the control API;
  applies a media service to one or more of the plurality of WebRTC interactive flows to generate one or more media server flows; and
  provides the one or more media server flows to one or more of the plurality of WebRTC clients.

2. The system of claim 1, wherein the WebRTC-enabled media server receives the stream establishment application in response to a Hyper Text Transfer Protocol (HTTP) request or a Web Sockets request, or combinations thereof.

3. The system of claim 1, wherein:
  the control API receives a media server command from the WebRTC application server; and
  the WebRTC functionality provider applies a media service indicated by the media server command to one or more of the plurality of WebRTC interactive flows.

4. The system of claim 3, wherein the control API receives the media server command via a Representational State Transfer (REST) API invocation or a JavaScript API invocation.

5. The system of claim 1, wherein:
  the WebRTC functionality provider generates a media server event responsive to applying the media service to the one or more of the plurality of WebRTC interactive flows; and
  the control API provides the media server event to the WebRTC application server.

6. The system of claim 5, wherein the control API provides the media server event via a REST API or a JavaScript API.

7. The system of claim 1, wherein:
  the control API comprises a JavaScript API; and
  the WebRTC-enabled media server further receives a media control application configured to access the functionality of the WebRTC functionality provider via the control API.

8. A method for providing Web Real-Time Communications (WebRTC) media services, comprising:
  providing, by a WebRTC-enabled media server executing on a computing device, a scripting engine, a WebRTC functionality provider, a control application programming interface (API) providing an interface between the scripting engine and the WebRTC functionality provider, and a WebRTC client API;
  receiving, by the WebRTC-enabled media server, a stream establishment application from a WebRTC application server;
  establishing, via execution of the stream establishment application by the scripting engine and through the WebRTC client API, a plurality of WebRTC interactive flows associated with corresponding ones of a plurality of WebRTC clients through a WebRTC initiation dialogue between the stream establishment application of the Web-RTC-enabled media server and each of the plurality of WebRTC clients, wherein the WebRTC-enabled media server interacts through the WebRTC client API with the WebRTC clients as a WebRTC peer and provides media server functionality based on media server commands received from the WebRTC application server through the control API;
  applying a media service to one or more of the plurality of WebRTC interactive flows to generate one or more media server flows; and
  providing the one or more media server flows to one or more of the plurality of WebRTC clients.

9. The method of claim 8, wherein receiving the stream establishment application comprises receiving the stream establishment application in response to a Hyper Text Transfer Protocol (HTTP) request or a Web Sockets request, or combinations thereof.

10. The method of claim 8, further comprising:
  receiving, via the control API, a media server command from the WebRTC application server; and
  applying a media service indicated by the media server command to one or more of the plurality of WebRTC interactive flows.

11. The method of claim 10, wherein receiving the media server command comprises receiving the media server command via a Representational State Transfer (REST) API invocation or a JavaScript API invocation.

12. The method of claim 8, further comprising:
  generating a media server event responsive to applying the media service to the one or more of the plurality of WebRTC interactive flows; and
  providing, via the control API, the media server event to the WebRTC application server.

13. The method of claim 12, wherein providing the media server event comprises providing the media server event via a REST API or a JavaScript API.

14. The method of claim 8, wherein:
  the control API comprises a JavaScript API; and
  the method further comprises receiving a media control application configured to access the functionality of the WebRTC functionality provider via the control API.

15. A non-transitory computer-readable medium having stored thereon computer-executable instructions to cause a processor to implement a method for providing Web Real-Time Communications (WebRTC) media services, comprising:
  providing, by a WebRTC-enabled media server, a scripting engine, a WebRTC functionality provider, a control application programming interface (API) providing an interface between the scripting engine and the WebRTC functionality provider, and a WebRTC client API;
  receiving, by the WebRTC-enabled media server, a stream establishment application from a WebRTC application server;
  establishing, via execution of the stream establishment application by the scripting engine and through the WebRTC client API, a plurality of WebRTC interactive flows associated with corresponding ones of a plurality of WebRTC clients through a WebRTC initiation dialogue between the stream establishment application of the Web-RTC-enabled media server and each of the plurality of WebRTC clients, wherein the WebRTC-enabled media server interacts through the WebRTC client API with the WebRTC clients as a WebRTC peer and provides media server functionality based on media server commands received from the WebRTC application server through the control API;

applying a media service to one or more of the plurality of WebRTC interactive flows to generate one or more media server flows; and providing the one or more media server flows to one or more of the plurality of WebRTC clients.

16. The non-transitory computer-readable medium of claim 15 having stored thereon the computer-executable instructions to cause the processor to implement the method, wherein receiving the stream establishment application comprises receiving the stream establishment application in response to a Hyper Text Transfer Protocol (HTTP) request or a Web Sockets request, or combinations thereof.

17. The non-transitory computer-readable medium of claim 15 having stored thereon the computer-executable instructions to cause the processor to implement the method, further comprising:

receiving, via the control API, a media server command from the WebRTC application server; and applying a media service indicated by the media server command to one or more of the plurality of WebRTC interactive flows.

18. The non-transitory computer-readable medium of claim 17 having stored thereon the computer-executable instructions to cause the processor to implement the method, wherein receiving the media server command comprises receiving the media server command via a Representational State Transfer (REST) API invocation or a JavaScript API invocation.

19. The non-transitory computer-readable medium of claim 15 having stored thereon the computer-executable instructions to cause the processor to implement the method, further comprising:

generating a media server event responsive to applying the media service to the one or more of the plurality of WebRTC interactive flows; and providing, via the control API, the media server event to the WebRTC application server.

20. The non-transitory computer-readable medium of claim 19 having stored thereon the computer-executable instructions to cause the processor to implement the method, wherein providing the media server event comprises providing the media server event via a REST API or a JavaScript API.

* * * * *

UNITED STATES PATENT AND TRADEMARK OFFICE
CERTIFICATE OF CORRECTION

PATENT NO. : 10,581,927 B2  
APPLICATION NO. : 14/255361  
DATED : March 3, 2020  
INVENTOR(S) : Joel Ezell and John H. Yoakum Page 1 of 1

It is certified that error appears in the above-identified patent and that said Letters Patent is hereby corrected as shown below:

In the Claims

Column 15, Line 25, please delete "Web Sockets" and insert --WebSockets-- therein.

Column 16, Line 17, please delete "Web Sockets" and insert --WebSockets-- therein.

Column 16, Line 54, after "establishment application from" delete "a" therein.

Column 17, Line 14, please delete "Web Sockets" and insert --WebSockets-- therein.

Signed and Sealed this  
Fifth Day of May, 2020

Andrei Iancu  
*Director of the United States Patent and Trademark Office*